United States Patent
Serebrin (10) Patent No.: US 8,032,897 B2
(45) Date of Patent: Oct. 4, 2011

(54) PLACING VIRTUAL MACHINE MONITOR (VMM) CODE IN GUEST CONTEXT TO SPEED MEMORY MAPPED INPUT/OUTPUT VIRTUALIZATION

(75) Inventor: Benjamin C. Serebrin, Mountain View, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1099 days.

(21) Appl. No.: 11/831,119

(22) Filed: Jul. 31, 2007

(65) Prior Publication Data

US 2009/0037936 A1    Feb. 5, 2009

(51) Int. Cl.
    G06F 3/00   (2006.01)
    G06F 9/44   (2006.01)
    G06F 9/46   (2006.01)
    G06F 13/00  (2006.01)

(52) U.S. Cl. .............. 719/318; 718/1; 710/260
(58) Field of Classification Search .......... 719/318; 718/1; 710/260
    See application file for complete search history.

(56) References Cited

U.S. PATENT DOCUMENTS

| | | | | |
|---|---|---|---|---|
| 4,718,008 A * | 1/1988 | Chang et al. | | 711/209 |
| 5,303,378 A * | 4/1994 | Cohen | | 710/264 |
| 6,785,886 B1 * | 8/2004 | Lim et al. | | 718/1 |
| 7,209,994 B1 | 4/2007 | Klaiber | | |
| 2003/0217250 A1 | 11/2003 | Bennett et al. | | |
| 2004/0003324 A1 * | 1/2004 | Uhlig et al. | | 714/38 |
| 2004/0117532 A1 | 6/2004 | Bennett et al. | | |
| 2007/0234358 A1 * | 10/2007 | Hattori et al. | | 718/1 |
| 2008/0082722 A1 * | 4/2008 | Savagaonkar et al. | | 711/6 |
| 2009/0006805 A1 * | 1/2009 | Anderson et al. | | 711/207 |

OTHER PUBLICATIONS

U.S. Appl. No. 11/066,873, filed Feb. 25, 2005.
Intel, "Intel 64 and IA-32 Architectures, Software Developer's Manual," vol. 3B, System Programming Guide, Part 2, May 2007, 6 pages.
Carl A. Waldspurger, USENIX Association, "Proceedings of the 5th Symposium on Operating Systems Design and Implementation," Dec. 9-11, 2002, 15 pages.
Carl Waldspurger, vmware, "Memory Resource Management in VMware ESX Server," OSDI '02 Presentation, Dec. 10, 200225 pages.
XenFaq—Xen Wiki, http://wiki.xensource.com/xenwiki/XenFaq?action=print, 15 pages, 2007.
Paul Barham, et al., "Xen and the Art of Virtualization," SOSP'03, Oct. 19-22, 2003, ACM, 14 pages.

* cited by examiner

*Primary Examiner* — Diem Cao
(74) *Attorney, Agent, or Firm* — Lawrence J. Merkel; Meyertons, Hood, Kivlin, Kowert & Goetzel, P.C.

(57) ABSTRACT

In one embodiment, a method comprises: obtaining use of one or more pages in a guest physical address space of a guest; storing handler code to process one or more input/output (I/O) and/or interrupt events in the one or more pages; and redirecting a first event of the one or more I/O events from guest handler code that would process the first event to the handler code in the one or more pages. Also contemplated is a computer accessible medium comprising a plurality of instructions, which, when executed by a computer, implement the method.

21 Claims, 6 Drawing Sheets

PLACING VIRTUAL MACHINE MONITOR (VMM) CODE IN GUEST CONTEXT TO SPEED MEMORY MAPPED INPUT/OUTPUT VIRTUALIZATION

BACKGROUND

1. Field of the Invention

This invention is related to the field of virtualization in computer systems and, more particularly, to input/output (I/O) device virtualization and/or interrupt virtualization such as advanced programmable interrupt controller (APIC) virtualization.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine monitor (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

SUMMARY

In one embodiment, a method comprises: obtaining use of one or more pages in a guest virtual and/or physical address space of a guest; storing handler code to process one or more input/output (I/O) or interrupt events in the one or more pages; and redirecting a first event of the one or more I/O or interrupt events from guest handler code that would process the first event to the handler code in the one or more pages. Also contemplated is a computer accessible medium comprising a plurality of instructions, which, when executed by a computer, implement the method.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Figure 1:
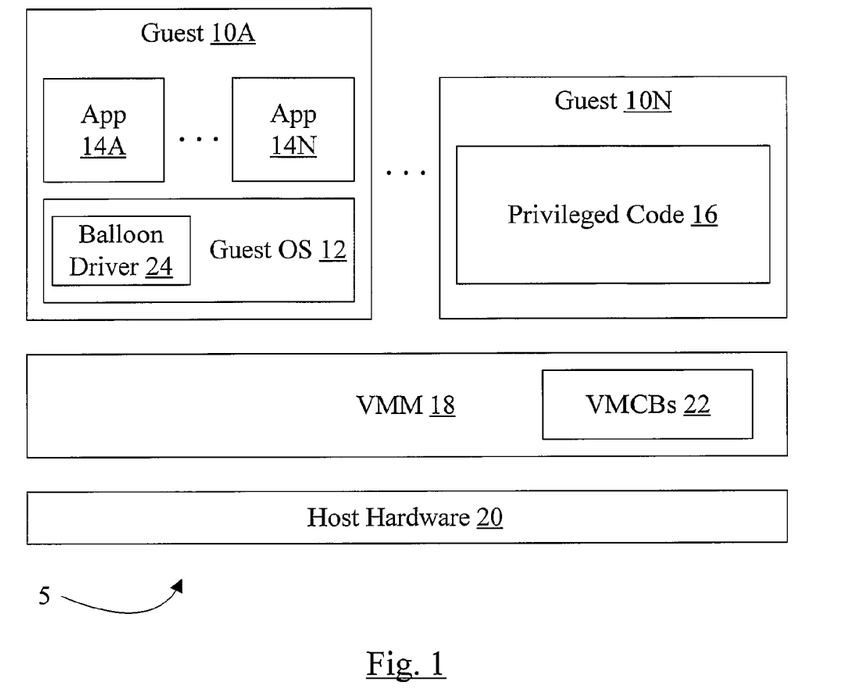
FIG. 1 is a block diagram of one embodiment of a computer system that implements virtualization.

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine monitor (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20. In the illustrated embodiment, the guest OS 12 includes a balloon driver 24.

The host hardware 20 generally includes all of the hardware included in the computer system 5. In various embodiments, the host hardware 20 may include one or more processors, memory, peripheral devices (also referred to as input/output (I/O) devices), and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, Hyper-Transport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware 20 may include hardware support for virtualization. For example, the processor(s) may include hardware support for virtualization, as will be described in more detail below. Generally, the processors in the host hardware 20 may be configured to execute the instructions in the various software described herein, including the VMM 18, the guest OS 12, the applications 14A-14N, and the privileged code 16, for example.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored.

In one embodiment, the VMM 18 may also have an area of memory allocated to store the processor state corresponding to the VMM 18 (and/or the host). When the VMRUN is executed, the processor state corresponding to the VMM 18 may be saved in the area (the "host save area"). When the guest exits to the VMM 18, the processor state from the area may be reloaded from the host save area to permit the VMM 18 to continue execution. In one implementation, for example, the processor may implement a register (e.g. a model specific register, or MSR) to store the address of the host save area.

Additionally, the VMCB 22 may include an intercept configuration that identifies intercept events that are enabled for the guest. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event in the VMM 18.

In one embodiment, the VMCB 22 may further include other control bits that may cause the processor to perform certain actions upon loading the VMCB 22. For example, the control bits may include indications to flush the translation lookaside buffer (TLB) in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

In the illustrated embodiment, the guest OS 12 includes the balloon driver 24. A balloon driver 24 may be used in virtualized systems to provide a mechanism for the VMM 18 to obtain pages from the guest OS 12 in the guest's physical address space. The guest OS 12 may "pin" the requested pages, ensuring that the pages are not reallocated to other uses in the guest 10A. For example, the balloon driver 24 may request one or more pages that are to be used as a direct memory access (DMA) target for one or more peripheral (I/O) devices. Since peripheral devices typically do not implement address translation, the devices use physical addresses to transfer data. By pinning the pages, the guest OS 12 ensures that the pages will be available for the asynchronous DMA read/write operations. The balloon driver 24 may also be used to reserve pages for use in remapping I/O events to handler code inserted by the VMM 18 instead of the guest handler code, as will be described in more detail below.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Processor Support

Figure 2:
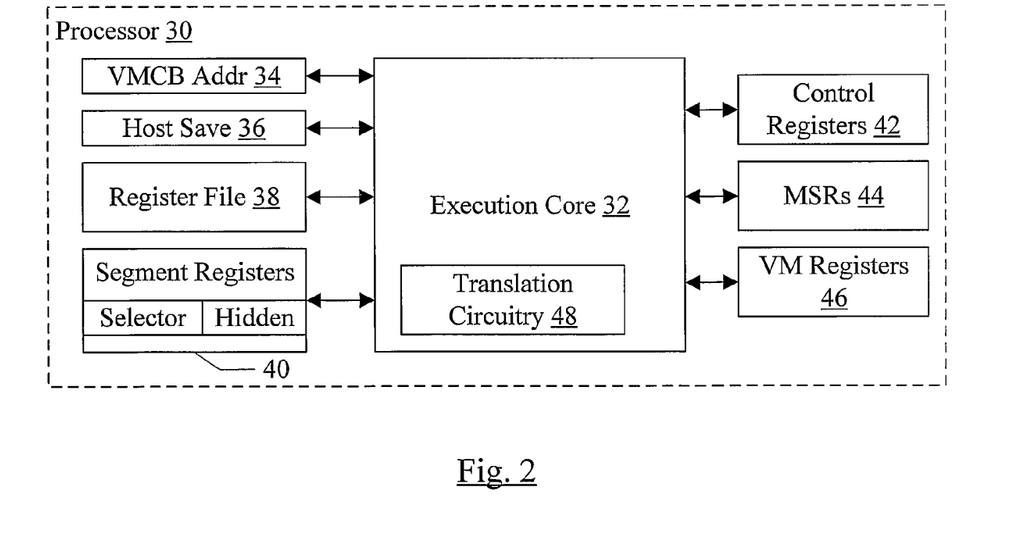
FIG. 2 is a block diagram of a portion of one embodiment of a processor.

FIG. 2 is a block diagram illustrating one embodiment of a processor 30 that may be included in the host hardware 20 and may provide support for virtualization as mentioned above. In the illustrated embodiment, the processor 30 includes an execution core 32, a VMCB address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a super-pipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions. The execution core 32 may also include translation circuitry 48 that performs address translation according to an address translation mechanism defined for the processor 30. In one embodiment, the address translation mechanism may include nested paging to support guests. In nested paging, the processor may support a set of page tables for each guest (translating from guest virtual to guest physical addresses) and another set of page tables (translating from guest physical to host physical addresses). Thus, a tablewalk initiated during guest execution may walk two sets of page tables when nested paging is used.

In one embodiment, the translation circuitry 48 may include a translation lookaside buffer (TLB) configured to cache the results of translations. The TLB may store the portion of the input address that gets translated (guest virtual or guest physical) and the corresponding portion of the resulting translated address (host physical). The portion may be the input/output address with the exception of the least significant bits that form an offset within the page. The page is the unit of translation, and may vary in size.

When executing a VMRUN instruction, the execution core 32 may save the address of the VMCB identified by the VMRUN instruction in the VMCB address register 34. Subsequently, during a guest exit, the execution core 32 may save the partial processor state to the VMCB indicated by the VMCB address register 34. The host save register 36 may store an address of a host save area in which host processor state (e.g. corresponding to the VMM 18) may be saved.

The register file 38 may comprise various registers defined for use with the instructions that the execution core 32 is configured to execute. For example, the register file 38 may comprise integer registers, floating point registers, multimedia registers, etc.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64™ extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), CR8 (the task priority register, or TPR), etc.

The MSRs 44 may comprise one or more registers that are implementation dependent. That is, the instruction set architecture may permit a given implementation to define any set of MSRs 44 that may be desirable for that implementation.

The VM registers 46 comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 2. For example, the VM registers 46 may include registers that may be loaded with virtual interrupt state to permit an interrupt to be injected into a guest. The VM registers 46 may also include an intercept register or registers. The intercept register or registers may store the intercept configuration. The execution core 32 may be configured to monitor for various intercepts indicated in the intercepts register, and to exit the guest in response to detecting an event that is to be intercepted. The intercepts register may be loaded from the VMCB 22 of a guest 10A-10N when execution of that guest 10A-10N is initiated (e.g. using the VMRUN instruction described above). Other VM registers 46 may be included to virtualize various other processor state, system resources, etc. In some embodiments, some or all of the VM registers 46 may be defined as MSRs.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 3:
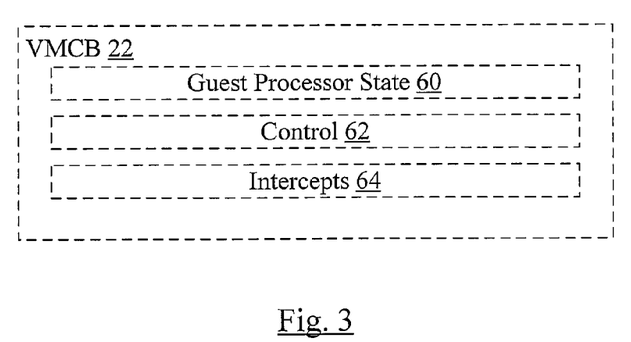
FIG. 3 is a block diagram of one embodiment of a virtual machine control block.

FIG. 3 is a block diagram of one embodiment of a VMCB 22. In the embodiment of FIG. 3, the VMCB 22 may include a guest processor state 60, control data 62, and intercepts 64. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the VMRUN instruction. The processor 30 may save processor state from the processor 30 to the guest processor state 60 during the guest exit. The guest processor state 60 may be defined to store all the processor state, even if the processor 30 only saves/loads partial state as described above. Other state may be saved/loaded by the VMM 18 as needed. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit. The intercepts 64 may specify which events are enabled for intercept (causing an exit from the guest). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications. There may be one intercept indication in the intercepts 64 for each intercept event.

Figure 4:
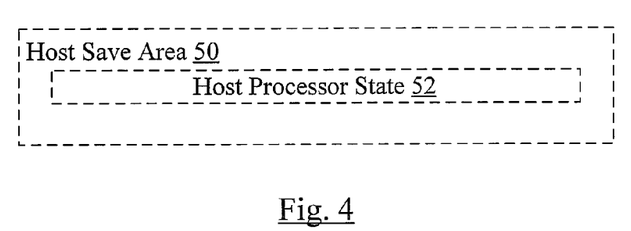
FIG. 4 is a block diagram of one embodiment of a host save area.

FIG. 4 is a block diagram of one embodiment of a host save area 50 that may be used to store host processor state 52. The host processor state 52, similar to the guest processor state 60, may be defined to store all the processor state that is considered part of the context. However, the host processor state 52 may correspond to the VMM 18 (and other host code, such as a host O/S, in some embodiments). In other embodiments, the host processor state 52 may not be defined to store all the processor state. The host processor state 52 may be defined the same as the guest processor state 60 in some embodiments. The processor 30 may save processor state from the processor 30 to the host processor state 52 during execution of the VMRUN instruction, and may load processor state to the processor 30 from the host processor state 52 during a guest exit to the VMM 18. The host save register 36 may store an address that locates the host save area 50.

Inserting VMM Code into Guest to Handle I/O Events Including APIC/Interrupt Events In one embodiment, the VMM 18 may be configured to insert handler code within the guest context to handle various I/O events including APIC/Interrupt events ("VMM handler code"). In general, an I/O event may comprise any sort of communication, interrupt, or fault that is associated with a peripheral device. For example, an I/O event may be an access to memory mapped I/O (MMIO). An MMIO access may be a read or write to I/O that is performed through a memory address. That is, the address that is used to access the device is part of the memory address space (e.g. the guest physical space, in this embodiment), but the address is mapped to the device instead of memory. Thus, the read/write is routed to the addressed device instead of reading/writing a memory location. However, the processor may treat the operation like a memory operation, rather than an I/O operation. An I/O operation often has more restrictions on execution, such as requiring in-order execution and/or non-speculative execution. Other I/O events may include interrupts initiated by or on behalf of the device. An interrupt may generally comprise a mechanism to cause the processor to stop execution of currently executing code to execute handler code that is designated by the interrupt. After the handler code is executed, the code that was interrupted may resume execution on the processor. The mechanism may be implemented in a variety of fashions (e.g. a signal asserted to the processor, a message delivered to the processor, etc.). One popular interrupt mechanism in personal computers (PCs) is the advanced programmable interrupt controller (APIC). Among other things, the APIC mechanism includes a task priority register (TPR) that is frequently read by the guest. The TPR reads (and writes, in some embodiments) may be handled in the VMM handler code, for example. In some cases below, interrupt events will be referred to in addition to I/O events. However, it is intended that the term I/O events include interrupt events as well as other events.

The VMM handler code may be executed without an intercept, and thus without a guest exit. The VMM handler code may process at least some I/O events and/or interrupt events, and may exit to the guest for events that the VMM handler code cannot process. Thus, to the extent that the VMM handler code avoids guest exits that would otherwise occur to virtualize I/O, higher performance may be realized in some embodiments.

The VMM 18 may redirect the processing of the I/O events from guest handler code that is designed to handle such events (e.g. in a non-virtualized environment) to the VMM handler code. The mechanism for redirecting the events may vary from implementation to implementation. Some processor instruction set architectures specify a programmable mechanism for locating handler code. In the x86 architecture, for example, an interrupt descriptor table (IDT) has entries for each fault/interrupt. The entry is programmed to point to the handler code for that fault/interrupt. Other processor architectures may have one or more data structures (similar to the IDT, but with any desired structure) to specify handlers for faults/interrupts. Still further, other processor architectures may program the addresses of handler code into one or more registers. Yet other processor architectures may have fixed handler code addresses. In such cases, the VMM 18 may modify the handler code at the fixed address to branch to the VMM handler code. The modifications may be hidden in various implementation-specific fashions. The x86 instruction set architecture, and its IDT, will be used as an example herein but other embodiments may implement other instruction set architectures.

Generally, handler code may comprise any instruction sequence or sequences that is executed in response to the detection of an event, to provide processing of that event. The handler code may take corrective action and return to the instruction for which the event was detected, or return to an instruction following the instruction for which the event was detected. If the corrective action cannot be taken, the handler code may not return to the instructions for which the event was detected.

Specifically, in one embodiment, the VMM 18 may ensure that pages including MMIO are marked as not present in the shadow or nested page tables. An MMIO access may thus experience a page fault. The VMM 18 may also redirect the page fault from the guest's page fault handler to a VMM page fault handler 82B. The VMM page fault handler code may emulate at least some MMIO accesses (or may perform the MMIO accesses on behalf of the guest) and thus may prevent some guest exits. MMIO accesses that cannot be emulated or performed by the VMM page fault handler code may be performed via a guest exit from the VMM page fault handler code.

In one embodiment, the IDT created by the guest may be shadowed in a shadow IDT. The guest IDT may be marked as read-only (i.e. not writeable), so that attempts by the guest to update the guest IDT may cause page faults. Thus, the VMM 18 (through VMM page fault handler code) may monitor guest updates to the IDT and may update the shadow IDT to reflect the guest's changes. The processor may be programmed to point to the shadow IDT, and thus the events may be redirected to the VMM handler code.

In order to insert handler code into the guest's context, the VMM 18 may obtain one or more pages from the guest (e.g. from the guest OS 12) to store the code. The pages may be obtained using the balloon driver 24, for example. The VMM 18 may ensure that the guest cannot write the pages, so that the inserted handler code cannot be changed by the guest. For example, the VMM 18 may mark the pages read-only in the guest shadow page tables or nested page tables, so that translations to the obtained pages may fail.

Figure 5:
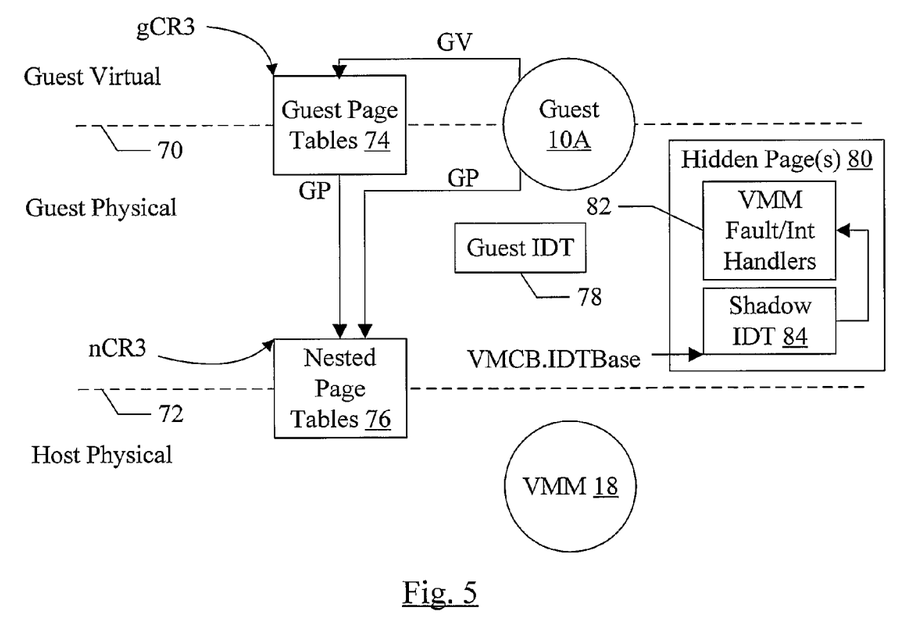
FIG. 5 is a block diagram illustrating one embodiment of address spaces in a virtualized computer system and the guest, VMM, and certain code and data structures.

FIG. 5 is a block diagram illustrating various address spaces of one embodiment of the computer system 5 for one embodiment. FIG. 5 illustrates a guest virtual address space (above dashed line 70), a guest physical address space (between dashed lines 70 and 72), and a host physical address space (below dashed line 72). FIG. 5 also illustrates a guest IDT 78 and one or more hidden pages 80 that store one or more VMM fault and/or interrupt handlers 82 and a shadow IDT 84.

A guest such as the guest 10A may run partially in the guest virtual address space and partially in the guest physical address space, illustrated by showing the guest 10A straddling the dashed line 70. For example, the guest 10A includes the guest OS 12 and the applications 14A-14N. The guest OS 12 (or at least part of the guest OS 12, such as the kernel) may run in the guest physical address space. The applications 14A-14N may run in the guest virtual address space. The guest 10A may manage a set of guest page tables 76, pointed to by a page table base address register (gCR3, in FIG. 5). The guest 10A may translate guest virtual addresses (GV in FIG. 5) to guest physical addresses (GP) through the guest page tables 74.

The guest OS 12 may also manage the guest IDT 78, mapping faults and interrupts to handler code designed to process the fault/interrupt. The VMM 18 may manage the shadow IDT 84, which may redirect at least some of faults/interrupts to VMM fault/interrupt handler code 82. Other faults/interrupts may be mapped to the guest handler code, the same as the guest IDT 78. The VMCB 22 for the guest 10A may include an IDTBase field, which may be programmed into the architected interrupt descriptor table register (IDTR) when the guest is to be executed. The VMM 18 may intercept reads and writes to the IDTR to prevent the guest from discovering the shadow IDT 84. Instead, the VMM 18 may capture values that the guest attempts to write to the IDTR (indicating the guest IDT 78) and may provide the most recent captured value if the guest attempts to read the IDTR.

A set of nested page tables 76 is also shown in FIG. 5, that translates guest physical addresses to host physical addresses. The nested page tables 76 may be pointed to by a second page table base address register (nCR3, in FIG. 5). The two page table base address registers may be implemented in the translation circuitry 48 shown in FIG. 2, for example. The nested page tables 76 may be managed by the VMM 18. The nested page tables 76 may translate guest physical addresses resulting from the guest page tables 74, as well as guest physical addresses generated directly by the guest 10A (e.g. by the guest OS 12).

Figure 6:
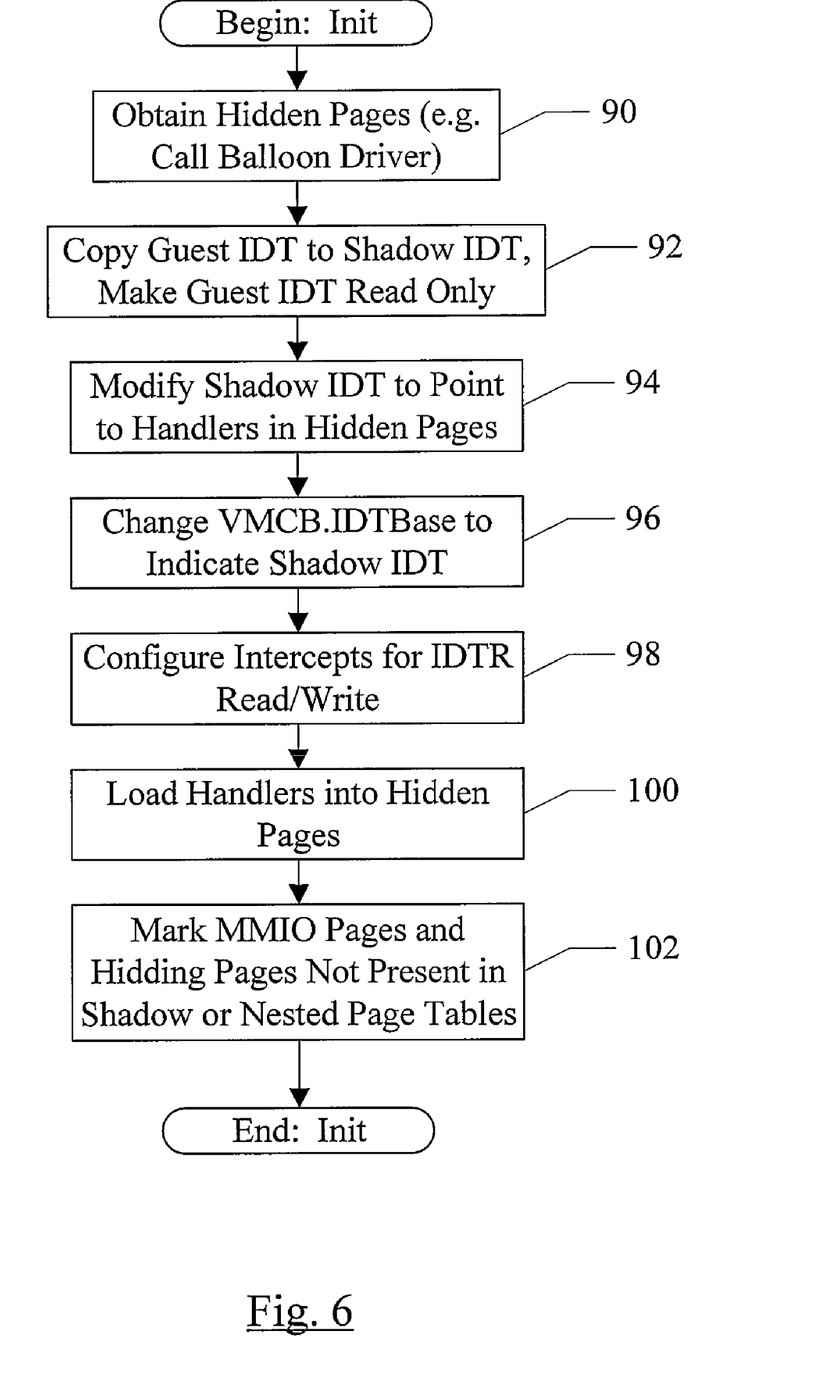
FIG. 6 is a flowchart illustrating one embodiment of initialization of certain data structures related to input/output devices, and particularly to memory-mapped I/O devices.

Turning next to FIG. 6, a flowchart is shown illustrating operation of one embodiment of the VMM 18 to initialize a guest to redirect I/O or interrupt events to VMM handler code. The initialization may be performed when a guest is first invoked, or may be performed whenever redirection of I/O or interrupt events to VMM handler code (instead of guest handler code) is desired. While the blocks are shown in a particular order for ease of understanding, other orders may be used. The VMM 18 may comprise instructions which, when executed on the computer system 5, perform the flowchart of FIG. 6.

The VMM 18 may obtain one or more pages to be the hidden pages 80 in the guest virtual and physical address spaces (block 90). For example, in the embodiment of FIG. 1, the VMM 18 may invoke the balloon driver to request one or more pinned pages. The VMM 18 may copy the guest IDT 78 to the shadow IDT 84 in the pages 80 (block 92), and may mark the guest IDT 78 read-only so that the updates to the guest IDT 78 by the guest 10A cause a page fault. The VMM 18 may be able to track updates to the guest IDT 78 based on the page faults. That is, each attempt by the guest 10A to modify the guest IDT 78 may result in a page fault. The VMM 18 may be informed of the modifications to the guest IDT 78 via the page fault. The VMM 18 may modify the shadow IDT 84 to point to VMM handler code in the hidden pages 80 (block 94), and may change the VMCB.IDTBase to point to the shadow IDT 84 (block 96). The VMM 18 may also configure the intercepts in the VMCB 22 so that reads and writes to the IDTR are intercepted (so that the VMM 18 may emulate the IDTbase used by the guest, and also detect if a new guest IDT 78 is being selected—block 98). If a new guest IDT 78 is selected, the flowchart of FIG. 6 may be executed again (except for possibly obtaining the hidden pages and loading the VMM handler code into the pages). The VMM 18 may load the VMM handler code into the hidden pages 80 (block 100), and may mark MMIO pages as not present in the guest page tables (and/or the nested page tables) so that MMIO accesses may cause a page fault (block 102). Similarly, the hidden pages 80 may be marked as read only so that the guest cannot write those pages. The marking of MMIO pages as not present may be performed whenever new MMIO page translations are created as well. Alternatively, the pages may be marked as present but may have one or more reserved bits in the translation entry set. The reserved bits are required to be zero, and may cause a page fault as well when they are set. The reserved bits may serve as an error code indicating the source of the page fault.

Figure 7:
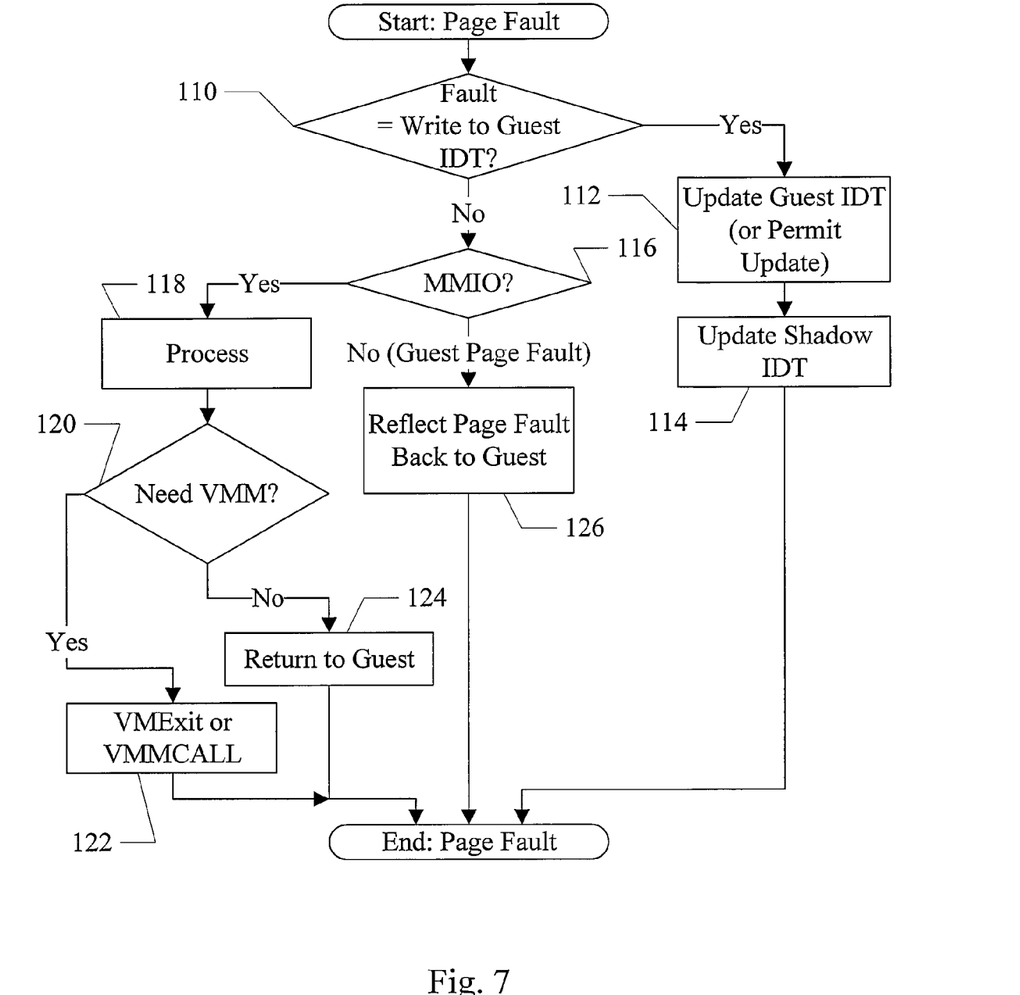
FIG. 7 is a flowchart illustrating one embodiment of page fault handling.

Turning now to FIG. 7, a flowchart is shown illustrating operation of one embodiment of the VMM handler code 82, in response to a page fault. That is, the flowchart of FIG. 7 may illustrate the VMM handler code 82 that is invoked in response to a page fault (to which the shadow IDT 84 redirects the page fault). While the blocks are shown in a particular order for ease of understanding, other orders may be used. The VMM handler code 82 may comprise instructions which, when executed on the computer system 5, perform the flowchart of FIG. 7. Generally, a page fault may occur if an attempt to translate an address through one or both of the guest page tables 74 and the nested page tables 76 is not successful (i.e. no corresponding guest physical or host physical address is determined).

The VMM handler code 82 may examine the page fault, and may determine if the fault is caused by a guest 10A attempt to write the guest IDT 78 (decision block 110). The manner in which the page fault source is determined may vary. For example, the address that caused the page fault may be saved by the processor (e.g. in a register, or a predefined memory location) according to the instruction set architecture implemented by the processor. The VMM handler code 82 may examine the address and the guest IDTR value (maintained by the VMM 18) to identify the page fault as a guest IDT write. Additional status bits may indicate the reason for the page fault as well. The address of the instruction that caused the page fault may be saved by the processor (the virtual address, typically), and the VMM 18 may locate the instruction and examine its operands to determine the reason for the page fault.

If the page fault is a write to the guest IDT (decision block 110, "yes" leg), the VMM handler code 82 may update the guest IDT 78 on behalf of the guest 10A, or may permit the guest 10A to perform the update after determining what the update is, and then set the guest IDT 78 to be read only again (block 112). The VMM handler code 82 may also update the shadow IDT 84 (block 114). If the updated IDT entry is not redirected, the VMM handler code 82 may simply make the same update to the shadow IDT 84 that was made to the guest IDT 78. If the updated IDT entry is redirected, the VMM handler code 82 may ignore the update, or may note the new code target in case the VMM handler code 82 wishes to invoke the guest handler code.

If the page fault is not a write to the guest IDT (decision block 110, "no" leg), The VMM handler code 82 may determine if the page fault is for an MMIO page (decision block 116). Similar to the discussion above for detecting a write to the guest IDT 78, the VMM handler code 82 may use various mechanisms to detect that the page fault is for an MMIO page (comparing the address for which the page fault is detected to MMIO addresses, examining the instruction, etc.). Additionally, in one embodiment, the reserved bits in the translation may be used as an error code to indicate an MMIO access as mentioned above. If the page fault is for an MMIO access (decision block 116, "yes" leg), the VMM handler code 82 may process the page fault (block 118).

Depending on the MMIO access, the VMM handler code 82 may be configured to perform the access or may need the VMM 18 to process the access. For example, in one embodiment, the Advanced Programmable Interrupt Controller (APIC) may be implemented in the computer system 5. In such an embodiment, the task priority register (TPR) may be frequently accessed. The VMM handler code 82 may perform the TPR access (or emulate the TPR access, reading/writing the TPR to a storage location that is being used by the VMM 18 to model the TPR). Thus, guest exits for the frequent TPR accesses may be avoided, while other APIC accesses may cause a guest exit. In one embodiment, a processor register (e.g. a newly defined control register, CR8) may be the TPR, and the TPR accesses may return the value in the register for a TPR access (or write the value to the register). Thus, the TPR accesses may be relatively rapid. Other embodiments may not implement the TPR in the processor (e.g. it may be part of the APIC). Additional APIC virtualization may be handled in the VMM handler code 82 in addition to the TPR handling. Still further, other MMIO accesses may be performed. Interprocessor interrupts and end of interrupt commands may be handled, in some embodiments.

If the VMM handler code 82 is not able to fully process the page fault (i.e. VMM 18 execution is needed—decision block 120, "yes" leg), the VMM handler code 82 may execute a VMMCALL instruction to call the VMM 18, or may perform an intercepted operation to cause a guest exit (VMExit) (block 122). Otherwise (decision block 120, "no" leg), processing is completed and the VMM handler code 82 may return to the guest (block 124). Specifically, in one embodiment, the next instruction after the faulting instruction may be returned to.

If the page fault is not for MMIO (decision block 116, "no" leg), the page fault may be a page fault in the guest. The VMM handler code 82 may reflect the page fault back into the guest (block 126). For example, the VMM handler code 82 may invoke the guest page fault handler code, as indicated in the page fault entry of the guest IDT 78. If the page fault will ultimately be handled in the VMM 18, the guest exit may occur from the guest page fault handler code.

Figure 9:
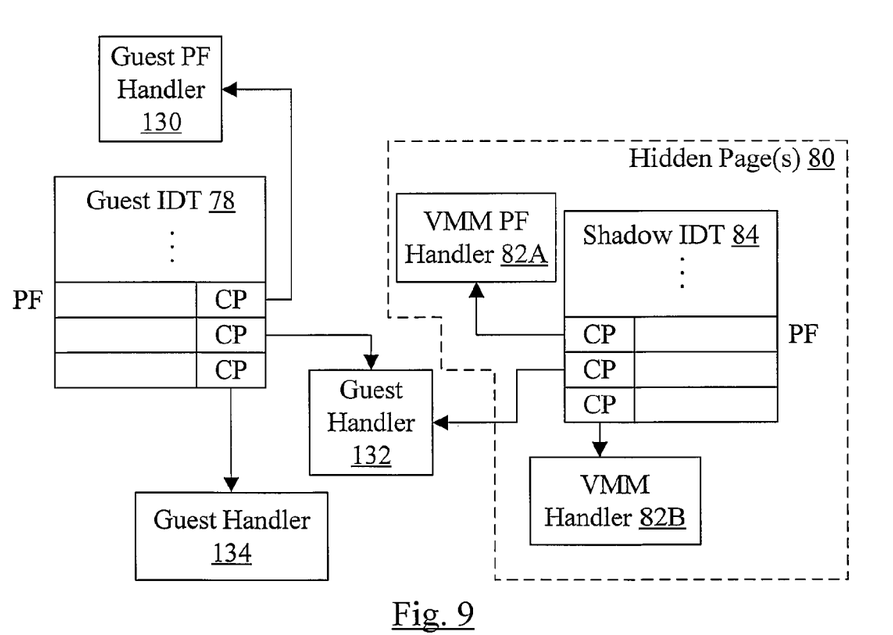
FIG. 9 is a block diagram of one embodiment of guest data structures and related shadow data structures.

In addition to handling MMIO accesses (at least partially) in the VMM handler code 82, the VMM handler code 82 may include code to handle various interrupts that are mapped by the IDT. In one embodiment, the IDT may include entries that are assigned to each fault that the processor may take (e.g. page fault, general protection fault, etc.) as well as each interrupt vector that is supported by the processor. Using the shadow IDT 84, any fault or interrupt may be redirected to VMM handler code 82. Such redirection is illustrated in FIG. 9, which shows the guest IDT 78 and the shadow IDT 84 in greater detail. The page fault entry (labeled PF in FIG. 9) of the guest IDT 78 includes a code pointer (CP) that points to the guest page fault handler code 130. Other entries may include code pointers to other guest handler code (e.g. code 132 and 134 in FIG. 9).

On the other hand, the hidden pages 80 may store the shadow IDT 84, which may replace the code pointer in the page fault entry to point to the VMM page fault handler code 82A. Other entries may have their code pointers modified to point to other VMM handlers such as VMM handler code 82B. Handler code 82A-82B may be part of the VMM handler code 82 inserted into the guest 10A by the VMM 18. Still other entries may not be modified, and thus the guest handler code may be used (e.g. the guest handler code 132 in FIG. 7, pointed to by the shadow IDT 84 and the guest IDT 78).

Figure 8:
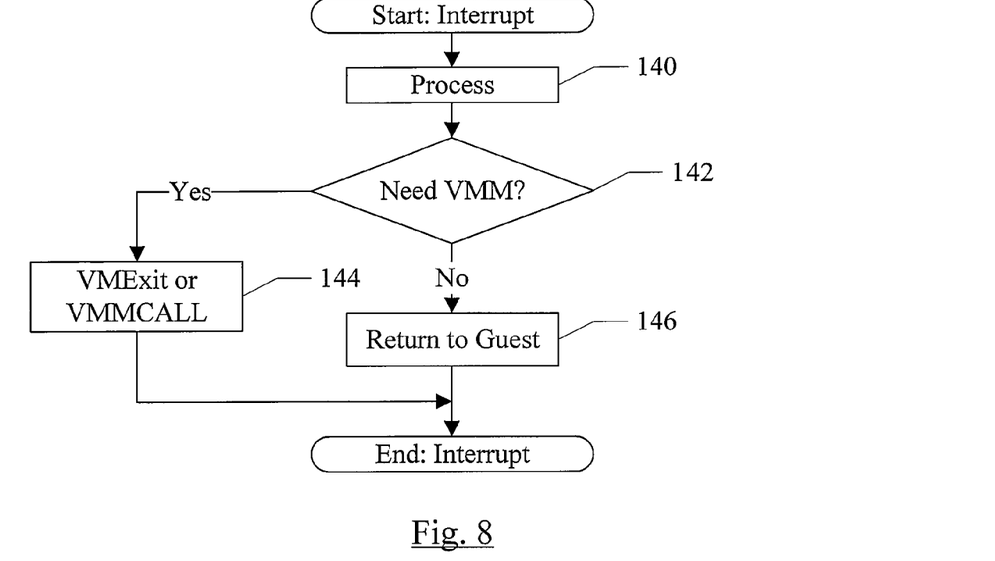
FIG. 8 is a flowchart illustrating one embodiment of interrupt handling.

Turning now to FIG. 8, a flowchart is shown illustrating operation of one embodiment of the VMM handler code 82, in response to an interrupt that has been redirected to the VMM handler code 82. That is, the flowchart of FIG. 8 may illustrate the VMM handler code 82 that is invoked in response to a particular interrupt (having a particular interrupt vector that selects an entry in the shadow IDT 84). While the blocks are shown in a particular order for ease of understanding, other orders may be used. The VMM handler code 82 may comprise instructions which, when executed on the computer system 5, perform the flowchart of FIG. 8.

The VMM handler code 82 may process the interrupt (block 140). If the VMM handler code 82 determines that the VMM 18 is needed to complete the interrupt processing (decision block 142, "yes" leg), the VMM handler code 82 may exit the guest using the VMExit or VMMCALL (block 144). If the VMM 18 is not needed, the VMM handler code 82 may return to the guest (block 146).

The VMM handler code 82 may perform various operations to handle the interrupt. For example, the VMM handler code 82 may change the interrupt vector associated with the interrupt, as part of virtualizing the device to which the vector is assigned. The VMM handler code 82 may permit some interrupts to be handled "natively" in the guest (with support from the VMM 18, in some embodiments), which may improve performance in some embodiments.

Figure 10:
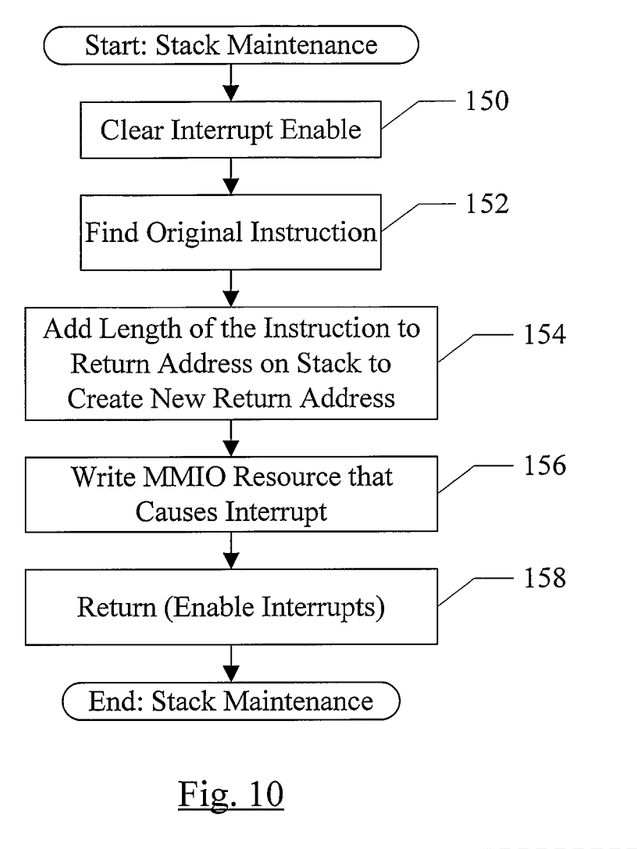
FIG. 10 is a flowchart illustrating one embodiment of stack maintenance.

It is noted that some MMIO accesses that are handled by the VMM handler code 82 may cause an interrupt to occur. For example, writing a lower priority to the TPR register may unmask an interrupt that is pending and that is higher priority than the new TPR level. Other resources may be written that cause interrupts, in other embodiments. In the x86 instruction set architecture, interrupts write information to the stack. In order for the stack state to be correct, it should indicate the instruction subsequent to the original instruction in the guest that attempt to access the TPR. FIG. 10 is a flowchart illustrating operation of one embodiment of the VMM handler code 82, to ensure that the stack has the correct state if such an update causes an interrupt. While the blocks are shown in a particular order for ease of understanding, other orders may be used. The VMM handler code 82 may comprise instructions which, when executed on the computer system 5, perform the flowchart of FIG. 10.

The VMM handler code 82 may clear the interrupt enable in the processor (e.g. the IF flag, in the x86 instruction set architecture) (block 150). The VMM hander code 82 may find the original instruction that attempted to perform the MMIO access (block 152). As mentioned previously, the instruction may be located using simple memory accesses, since the VMM handler code 82 executes within the guest 10A, rather than table walks that may be used in the VMM 18. The VMM handler code 82 may analyze the instruction to determine what the new value of the resource is. For example, in one embodiment, an opcode interpreter may be stored in the hidden pages 80. Alternatively, a table of previously translated instructions may be maintained by the VMM 18, and the VMM handler code 82 may look up data in the table to determine the new value of the resource (e.g. the table may indicate the source operand from which the value can be read). If the instruction is not found in the table, the VMM 18 may be called (or exited to) to interpret the instruction. The VMM handler code 82 may add the length of the instruction to the return address on the stack (e.g. 4 bytes from the top of the stack, in 32 bit mode) to create the new return address as the instruction following the instruction that writes the resource and potentially causes the interrupt (block 154). The VMM handler code 82 may write the MMIO resource (block 156) and return (which may enable interrupts, if interrupts are enabled in the original code) (block 158).

In other embodiments, the VMM 18 may modify the shadow IDT entry of the I/O events which may cause an interrupt to perform a task switch to the VMM handler code 82. Such an embodiment may avoid the stack issues highlighted above with regard to FIG. 10, since a task switch provides a separate stack for the target of the task switch to use. In such an embodiment, a writeable page may be obtained for the stack (in addition to the page or pages 80 used to store the shadow IDT 84 and the VMM handler code 82, or as part of the pages). Task switches may be used in 32 bit mode, but have been eliminated from 64 bit mode, in one embodiment. In such an embodiment, in 64 bit mode, an interrupt stack table field is provided in interrupt gates and task gates that permits a stack change. The interrupt stack table field may be used in 64 bit mode to obtain a separate stack for the VMM handler code 82.

Figure 11:
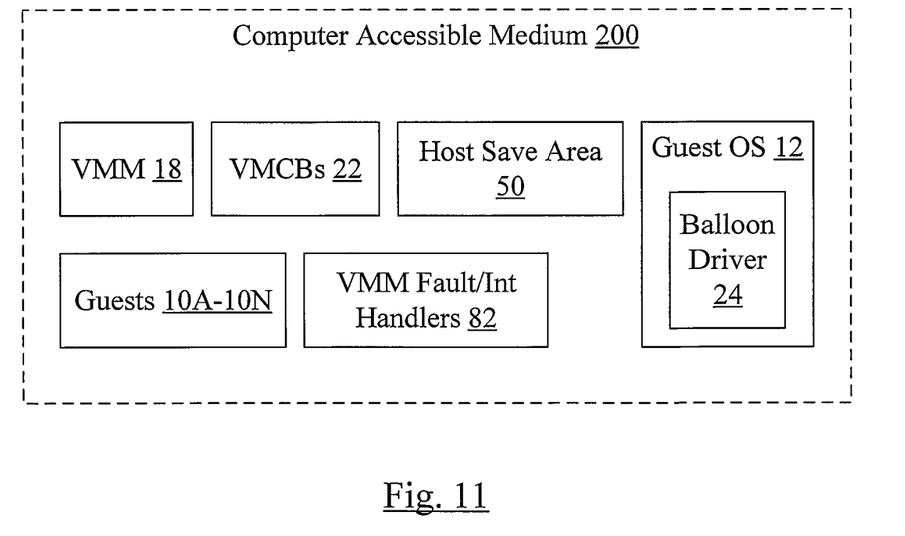
FIG. 11 is a block diagram of one embodiment of a computer accessible medium.

Turning now to FIG. 11, a block diagram of a computer accessible medium 200 is shown. Generally speaking, a computer accessible medium may include any media accessible by a computer to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. The computer accessible medium 200 may also include storage media accessible via transmission media such as a network and/or a wireless link. The computer accessible medium 200 in FIG. 11 may store one or more of the VMM 18, one or more VMCBs 22, the host save area 50, the guest OS 12 including the balloon driver 24, the VMM fault/interrupt handler code 82, and/or guests 10A-10N. The VMM 18 may comprise instructions which implement the operations described for the VMM 18 herein, when executed. Similarly, the balloon driver 24 may comprise instructions which implement the operations described herein for the balloon driver 24 and the VMM handler code 82 may comprise instructions which implement the operations described for the VMM handler code 82 herein, when executed. Generally, the computer accessible medium 200 may store any set of instructions which, when executed, implement a portion or all of the operations shown in FIGS. 6, 7, 8, and 10. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising:
    obtaining use of one or more pages in a guest physical address space of a guest;
    storing handler code to process one or more input/output (I/O) events in the one or more pages; and
    redirecting a first event of the one or more I/O events from guest handler code that would process the first event to the handler code in the one or more pages.

2. The method as recited in claim 1 further comprising:
    determining, in the handler code, that the handler code cannot complete processing of the first event; and
    exiting the guest to a virtual machine monitor (VMM) to complete processing of the first event.

3. The method as recited in claim 1 further comprising:
    completing the processing of the event in the handler code without exiting to a virtual machine monitor (VMM); and
    continuing execution of the guest.

4. The method as recited in claim 1 wherein the first event comprises an access to an address in the guest that is memory-mapped to I/O, and wherein the method further comprises marking a translation from a guest virtual page to a memory-mapped I/O page that includes the memory-mapped I/O address not present in the guest page table, wherein an attempt to access the memory-mapped I/O address from the guest causes a page fault, and wherein the handler code is executed to handle the page fault.

5. The method as recited in claim 4 further comprising:
    determining, in the handler code, that a second page fault is a page fault experienced in the guest that is not an I/O event; and
    reflecting the second page fault back to the guest for handling.

6. The method as recited in claim 4 further comprising:
    completing processing of the page fault in the handler code; and
    returning from the handler code to the source of the page fault.

7. The method as recited in claim 4 further comprising:
    determining, in the handler code, that the handler code cannot complete processing of the first event; and
    exiting the guest to a virtual machine monitor (VMM) to complete processing of the first event.

8. The method as recited in claim 7 wherein the exiting comprises executing a VMMCALL instruction.

9. The method as recited in claim 7 wherein the exiting comprises a virtual machine (VM) exit.

10. The method as recited in claim 1 wherein the redirecting comprises:
    copying a guest data structure that maps I/O events to various handlers to a shadow data structure;
    modifying the shadow data structure to map the first event to the handler code; and
    causing the guest to use the shadow data structure during execution instead of the guest data structure.

11. The method as recited in claim 10 wherein the data structure comprises an interrupt descriptor table (IDT).

12. The method as recited in claim 11 wherein modifying the shadow data structure comprises modifying a page fault entry of the IDT to indicate a task switch to the handler code.

13. The method as recited in claim 11 wherein another event of the I/O events is an interrupt.

14. A computer accessible storage medium storing a plurality of instructions which are executable to perform a method comprising:
    obtaining use of one or more pages in a guest physical address space of a guest;
    storing handler code to process one or more input/output (I/O) events in the one or more pages; and
    redirecting a first event of the one or more I/O events from guest handler code that would process the first event to the handler code in the one or more pages.

15. The computer accessible storage medium as recited in claim 14 wherein the plurality of instructions comprises the handler code, and the method further comprises:
    determining, in the handler code, that the handler code cannot complete processing of the first event; and
    exiting the guest to a virtual machine monitor (VMM) to complete processing of the first event.

16. The computer accessible storage medium as recited in claim 14 wherein the wherein the redirecting comprises:
    copying a guest data structure that maps I/O events to various handlers to a shadow data structure;
    modifying the shadow data structure to map the first event to the handler code; and
    causing the guest to use the shadow data structure during execution instead of the guest data structure.

17. The computer accessible storage medium as recited in claim 16 wherein the data structure comprises an interrupt descriptor table (IDT), and wherein the modifying comprises modifying a page fault entry of the IDT to indicate a task switch to the handler code.

18. A computer accessible storage medium storing a plurality of instructions which are executable to perform a method comprising:
    obtaining use of one or more pages in a guest physical address space of a guest;
    storing handler code to process one or more input/output (I/O) events in the one or more pages;
    redirecting a first event of the one or more I/O events from guest handler code that would process the first event to the handler code in the one or more pages, wherein the first event comprises an access to an address in the guest that is memory-mapped to I/O; and
    marking a translation from a guest virtual page to a memory-mapped I/O page that includes the memory-mapped I/O address not present in the guest page table, wherein an attempt to access the memory-mapped I/O address from the guest causes a page fault, and wherein the handler code is executed to handle the page fault.

19. The computer accessible storage medium as recited in claim 18 wherein the method further comprises:
    determining, in the handler code, that a second page fault is a page fault experienced in the guest that is not an I/O event; and
    reflecting the second page fault back to the guest for handling.

20. The computer accessible storage medium as recited in claim 18 wherein the method further comprises:
    completing processing of the page fault in the handler code; and
    returning from the handler code to the source of the page fault.

21. The computer accessible storage medium as recited in claim 18 wherein the method further comprises:
   determining, in the handler code, that the handler code cannot complete processing of the first event; and
   exiting the guest to a virtual machine monitor (VMM) to complete processing of the first event.

* * * * *